Jan. 5, 1937.    W. M. MASI    2,066,789
MEASURING DEVICE
Filed May 17, 1934    2 Sheets-Sheet 1

INVENTOR
William M Masi
BY
Emerson B Donnell
ATTORNEY

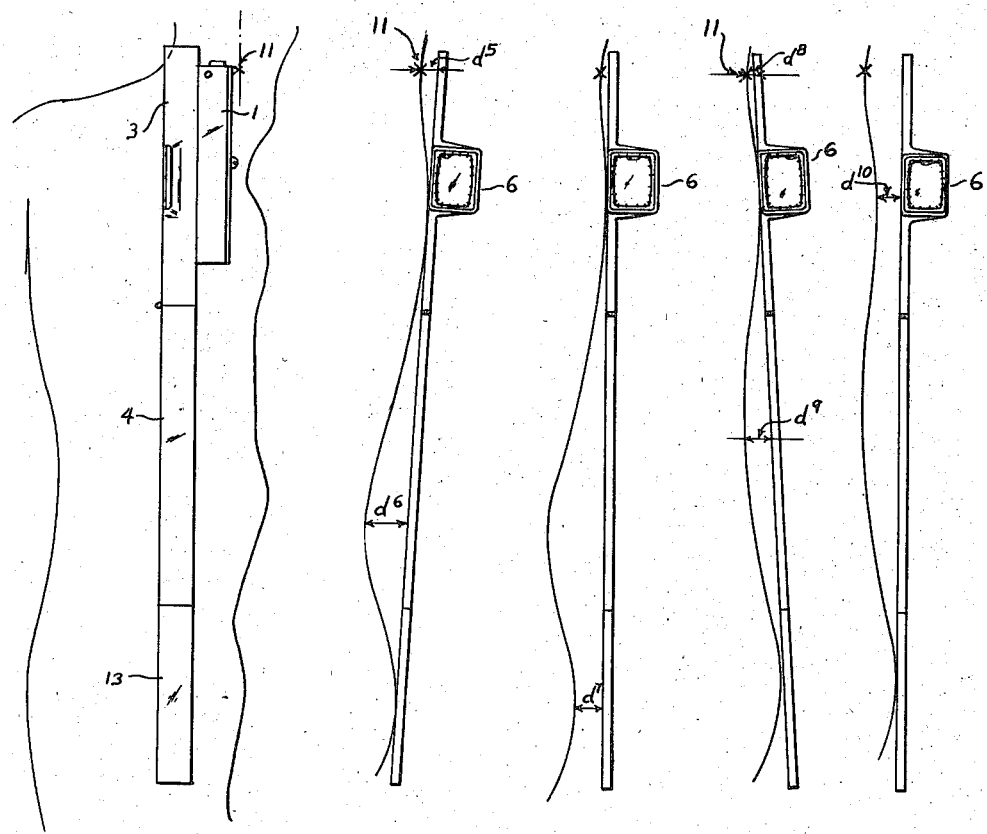
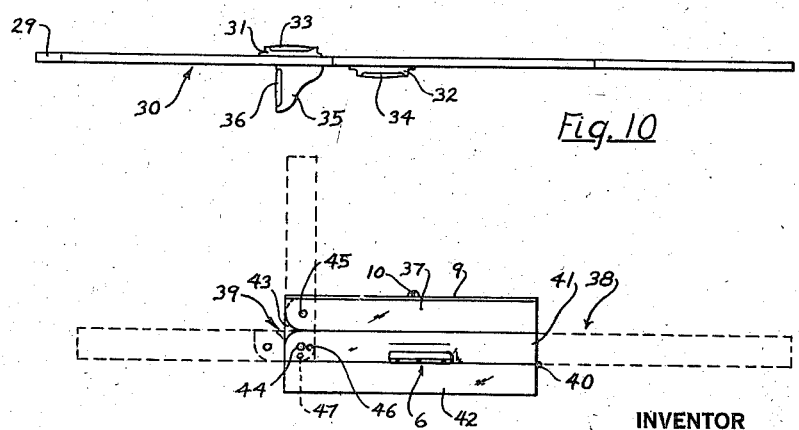

Patented Jan. 5, 1937

2,066,789

UNITED STATES PATENT OFFICE 2,066,789

MEASURING DEVICE

William M. Masi, Milwaukee, Wis.

Application May 17, 1934, Serial No. 726,124

8 Claims. (Cl. 33—7)

The present invention relates to measuring devices, and more particularly to such as are intended to be used by tailors or others who have occasion to measure the human body, and an object of the invention is to generally improve the construction and operation of devices of this class.

A further object is to provide for more accurate measurement than has been heretofore possible whereby to substantially reduce rejections, or the necessity of alterations in garments made according to such measurement.

A further object is to provide a device by means of which accurate measurements may be taken by persons not highly skilled in the measuring art.

A further object is to provide a device permitting accurate measurement of all the dimensions needed for obtaining a satisfactory fit in a garment made from these measurements, whereby to increase customer's confidence and satisfaction, and increase sales of tailored products made in accordance with these measurements.

A further object is to provide for the accurate measurement of irregularities in the figure being fitted so as to eliminate all "guess work" in fitting.

A further object is to provide a single device which is adapted to serve for all the special measurements involved in this particular type of measuring.

Further objects are to provide the following:

Means for definitely locating a tailor's rule on a figure to be measured;

Means for leveling the rule in either of two relatively inverted positions;

Unitary means for locating the rule in true horizontal and vertical positions;

Such a rule which may be folded into small compass;

An improved folding joint for a rule; and

Other objects and advantages which will be apparent presently.

Similar reference characters have been applied to the same parts throughout this specification and the accompanying drawings in which—

Fig. 4 is a fragmentary rear elevation of a figure with the device in position for a back measurement.

Fig. 5 is a side elevation of the same showing a method of taking measurements therewith.

Fig. 6 is a similar view showing another method of taking measurements with the apparatus.

Fig. 7 is a similar view showing the application of the device to a different type of figure.

Fig. 8 is a similar view showing a method of measuring this type of figure.

Fig. 10 is an elevation of a modified form of the apparatus.

Fig. 11 is a plan view of a further modified form of the apparatus.

Figure 1:
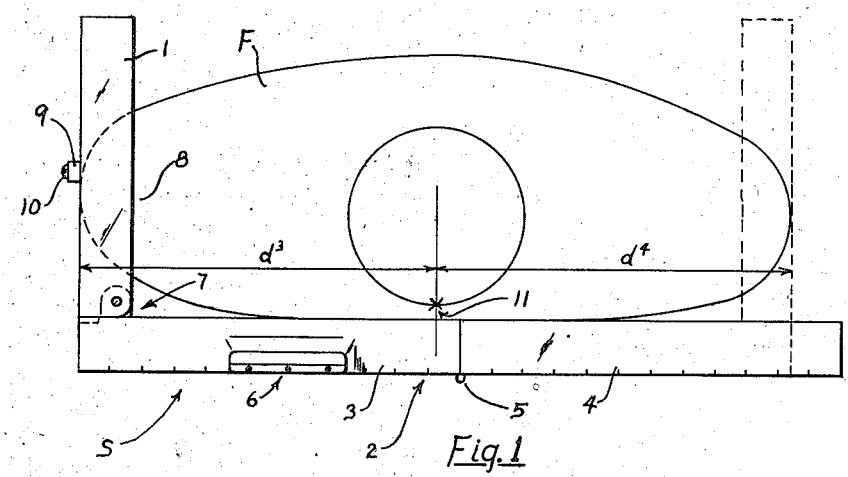
Fig. 1 is a plan view of an illustrative embodiment of the invention as applied to a figure to be measured.
Figure 2:
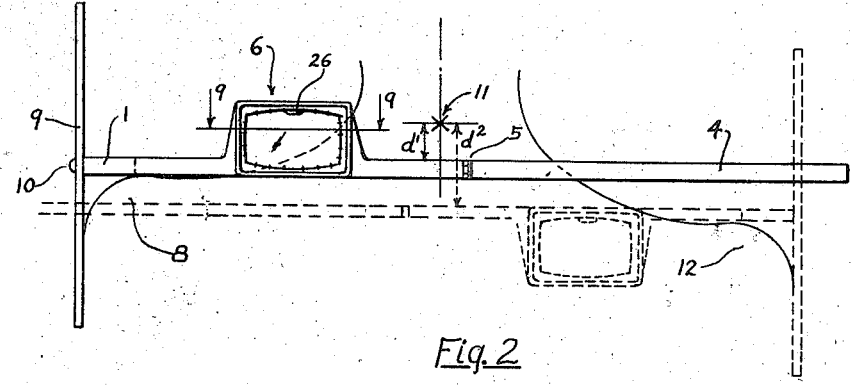
Fig. 2 is an elevation of the same, showing an alternative position of the apparatus in dotted lines.

As particularly shown in Figs. 1 and 2, the device comprises an instrument of the general nature of a "square", S, having legs 1 and 2, leg 2 being formed in sections 3 and 4, and jointed by means of a hinge 5 of suitable or well known type. Leg 2 is provided with a leveling device generally denoted by numeral 6, of a special type which will be more fully described below. Leg 1 is hingedly connected to leg 2 by means of a joint 7 so that it may readily be folded against the latter so as to reduce the bulk of the device so that it may be carried readily in an ordinary hand bag or the like, a device thus folded being illustrated in Fig. 3. The square as so far described is particularly adapted to be placed on a shoulder 8 of a figure F to be measured, and for locating the instrument in a definite position on the figure, a bar 9 is provided preferably pivoted to leg 1 by means of a pintle 10 or the like, so that the bar may be pivoted into various positions, for example parallel or transverse to leg 1.

The square is placed upon shoulder 8 as shown in Fig. 2, and bar 9 is placed against the outer muscle of the arm of the figure, thus determining a definite position of the square relatively to the body. Since the instrument rests upon a relatively bony, or firm portion of the body, and the bar may be very lightly applied to the arm, no error arises from any sinking of the instrument into the fleshy parts of the body.

The square when in this position is leveled by means of level 6, and the measurement $d^1$ is taken by means of an ordinary rule or tape not shown, from a point 11 marked on the center line of the neck of the figure, and representing approximately the level of the juncture between the neck and the inner upper surface of the shoulders. This point may be determined in any suitable manner, but is conveniently located an arbitrary distance below the collar of the shirt worn by the figure. The dimension $d^1$ then represents the slope of shoulder 8, and it is a definite measurement which may be accurately followed in cutting the pattern.

The instrument is inverted as shown in dotted lines, and a corresponding dimension $d^2$ is obtained for the other shoulder 12. A mark is also placed at this level, and the distance between the two marks represents the difference in slope of the two shoulders. The fact that bar 9 projects both above and below leg 1 permits the instrument to be applied to this other shoulder without alteration or adjustment, the level 6 being of a character which operates equally well in either position. Since few human figures are accurately symmetrical, it is important that such measurements as $d^1$ and $d^2$ be accurately obtained, particularly in classes of tailoring in which it is desirable to dispense with a try-on and alterations. The degree of slope of each shoulder is thus obtained, and also the difference in height, or slope of the two.

Leg 2 is graduated in any suitable units, such for example as inches, as shown whereby measurements $d^3$ and $d^4$ may be taken if desired at the same time as $d^1$ and $d^2$ respectively, being read directly from the leg 2 of the square. Another use for these graduations is in obtaining sleeve lengths, the leg 1 of the square being placed under the arm of the figure, and the proper length noted on the graduations of leg 2.

Figure 3:
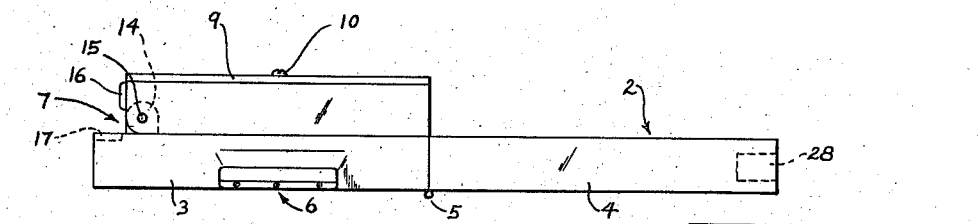
Fig. 3 is a plan view of such an apparatus in a partly folded position.

Another point of substantial variation in human figures is at the back, and for accurately determining the necessary dimensions for properly fitting various figures, the instrument is also arranged for use in a vertical position as shown in Figs. 4 to 8 inclusive. As shown in Fig. 3, leg 2 may be arranged to be lengthened if desired, as for example by means of an extension 13, and, with this in place, and leg 1, preferably, although not necessarily, folded down against portion 3, the instrument may be used in an upright position against the back of a figure as shown in Fig. 4. By a slight lengthening of the sections of leg 2, the necessity for extension 13 may be eliminated if desired.

The instrument when so applied will generally slope in one or the other direction as shown in Figs. 5 and 7, and level 6 will show by its deviation whether the seat or shoulder blade of the figure is more prominent. This gives an immediate preliminary classification of the figure, and dimensions $d^5$ and $d^6$ may be immediately secured with an ordinary rule not shown, being respectively the space between the rule and above mentioned point 11, and the indentation at the small of the back. The combined width of legs 1 and 2, when the former is folded against the latter as shown is a convenience in that it brings the edge of the rule very nearly to the center line of the back when the main portion of leg 2 is laterally displaced therefrom the amount necessary to contact properly the seat and blade.

Assuming the situation of Fig. 5, after these dimensions are secured, the instrument is brought to a plumb position as indicated by level 6, and shown in Fig. 6, after which dimension $d^7$ is obtained, these together with the girth measurements, taken in the ordinary manner at these points, give all the data necessary for obtaining a satisfactory fit the first time, without try-ons, and without guess-work.

In the event that the situation is as shown in Fig. 7, the operation is similar, the dimensions $d^8$, $d^9$, being obtained, after which the instrument is brought to a plumb position and $d^{10}$ obtained, this as before, together with the girth measurements, giving all the data necessary for a perfect fit.

Above mentioned leg 1 and portions 3 and 4 may be made of any suitable material such for example as wood or metal, and hinges 5 and 7 may be of any suitable or well-known type, but preferably of a character which will keep the component parts of the instrument in rigid alignment. A suitable construction for hinge 7 is shown in Fig. 3, the end of leg 1 being bifurcated for the reception of an ear 14, extending rigidly from portion 3 for a distance substantially less than the width of leg 1. A pin 15 extends through ear 14 and the bifurcated portion of leg 1, to form a pintle about which leg 1 and portion 3 may turn relatively to each other, and leg 1 is provided with a tongue 16 which enters a recess 17 in portion 3 when the leg 1 is swung into the unfolded, or open position, as shown in Fig. 1. This construction permits easy swinging movement of the parts and maintains correct alignment therebetween.

Figure 9:
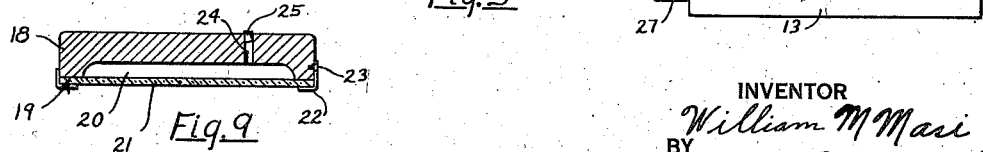
Fig. 9 is a horizontal sectional view of a part of the invention taken on the line 9—9 of Fig. 2.

Level 6 is of a special type which is arranged to indicate the various positions of the device above described. It consists of a block of suitable material 18, Fig. 9, having a front face 19 in which is formed a shallow cavity 20, of generally rectangular form, the side and end margins being slightly curved as shown in Fig. 2, the radius of these curves being chosen to give the degree of sensitiveness desired in the manner common in devices of this class. A plate of glass or other suitable transparent material 21 is suitably fixed against face 19 in liquid tight contact therewith in any suitable manner, such for example as by means of a frame 22 retained in place by suitable means such as screws 23, the glass forming the front wall of a liquid chamber defined by the margins of the cavity 20. The chamber may be substantially filled with liquid through an opening or port 24, and the port closed by means of a plug or the like 25, a small void or bubble 26 being left in the liquid.

This bubble will seek the highest point in the chamber, and consequently will travel along the curved margins of the recess 20, and stop in the middle of whichever margin happens to be uppermost, in the event the apparatus is truly horizontal, or vertical, indicating departures from either of these positions by its deviation from this mid-position.

Applicant understands that the curved glass tubes of ordinary levels operate in this way, but insofar as he is aware, he is the first to construct a level in which a single instrument can operate to indicate correctly a plurality of different positions, or a level glass or vial which can be inverted, and still operate with full efficiency.

Graduations may be provided either on the glass, or on some other convenient part as shown to indicate the true level or plumb positions, or if desired to indicate the amount of deviation therefrom.

Portion 13 is in the present instance provided with a tongue 27 of any desired cross section which may fit within a recess or socket 28 formed in portion 4 to receive it. The extension portion may therefore be added to the leg 2 at any time. If desired, a tongue and socket construction may be substituted for either or both of the hinge portions 5 and 7 within the contemplation of the invention.

Fig. 10 shows a modified structure generally similar to that of Figs. 1, 2, 3, etc., but which uses conventional level vials instead of the level 6. In this arrangement legs 29 and 30 are provided as before, the latter being jointed if desired to permit packing in small compass.

Leg 30 carries casings or frames 31 and 32, disposed above and below thereof when the instrument is in the position illustrated in Fig. 2, and each case is provided with a level vial of well known type 33 and 34, respectively, vial 33 indicating the level position of the instrument when it is in the position shown, and vial 34 serving when the instrument is inverted. A bracket 35 is also carried by the leg 30, and carries a third level vial 36, disposed generally at right angles to vials 33 and 34, and operative to indicate the true plumb position of the instrument for operating in the manner shown in Figs. 4 to 8 inclusive.

Fig. 11 shows an embodiment of the device in which a somewhat different arrangement to permit folding is utilized. In this arrangement the two legs 37 and 38 are joined by a special hinge arrangement 39 which permits extending leg 37 either at right angles to leg 38, or axially thereof, leg 38 being divided by a hinge 40 into sections 41 and 42. Leg 37 therefore serves two purposes, and extension 13 above described becomes unnecessary. The device is shown in folded position, and its two operative positions indicated in dotted lines.

Hinge portion 39 comprises a leaf member 43 received in a bifurcated portion of section 41, a hinge pin 44 being provided to allow pivotal movement. Leaf member 43 also extends into a bifurcated portion of leg 37, and a hinge pin 45 provides for pivotal movement between the leaf and leg 37. Suitable detents, stops or the like, such for example as a depression 46 in the bifurcated portion of section 41, yieldingly engaging suitable recesses such as 47 in leaf 43 when the latter is in the desired positions, may be provided to indicate the true right angle, and axial positions of leg 37 relatively to leg 38. Bar 9, and level 6 are preferably identical with those of the embodiment of Fig. 1.

The instrument as shown folds into very small compass, and when extended is sufficiently long for the back measurements without an extension such as 13.

It should be readily understood from the above description that the device of the present invention thereof will virtually eliminate errors of fitting when garments are made from measurements taken with the disclosed instrument. Consequently, substantially no expense for alteration is necessary, and annoyance to prospects in the form of mis-fits, try-ons, delays, etc., is avoided. The certainty of a good fit also makes a strong appeal to prospective customers, and is a considerable sales promotion factor.

The above being a full and complete description of the invention and illustrative embodiments of apparatus adapted for the practice thereof, what is claimed as new and desired to be secured by Letters Patent of the United States is:

1. In a tailor's rule the combination of a square having legs arranged to be fixed together transversely of each other, a bar transverse to one of said legs and arranged for locating the square on the shoulder of a body by contact with the outer arm surface thereof, said legs and bar being jointed to permit folding of said rule, and leveling means on said rule and arranged to indicate true horizontal positioning of said rule, said means being also arranged to indicate an inverted horizontal position and a true vertical position of said rule.

2. A level vial including a block having a face arranged to be substantially vertically disposed, and providing a cavity in said face, said cavity having a plurality of curved margins, the chords of the curves of which are disposed at angles to each other, a transparent element complementary to said face, and arranged to close said cavity, and a body of liquid in said cavity and containing an indicating bubble, said bubble being guided by the margins of said cavity, and visible through said transparent element.

3. A level vial including a block member having a face arranged to be substantially vertically disposed, and providing a cavity in said face, said cavity having a plurality of curved margins, the chords of the curves of which are disposed at angles to each other, a transparent member complementary to said face, and arranged to close said cavity, and a body of liquid in said cavity and containing an indicating bubble, said bubble being guided by the margins of said cavity, and there being graduations on one of said members, visible through said transparent member, and indicating the true positioning of said vial or the direction and amount of deviation therefrom.

4. In a tailor's rule the combination of a square having legs arranged to be fixed together transversely of each other, a bar transverse to one of said legs and arranged for locating the square on the shoulder of a figure by contact with the outer arm surface thereof, said legs and bar being jointed to permit folding of said rule, and a pair of relatively inverted spirit levels on said rule, and arranged to indicate the true horizontal positioning of said rule when placed on one shoulder of said figure, and also when said rule is placed in inverted position on the other shoulder of said figure.

5. In a tailor's rule the combination of a square having a leg arranged to extend across the back of a person to be measured, a second leg fixed with the first, transversely thereof, and arranged to rest on a shoulder of said person, and a bar fastened transversely of said second leg and positioned to contact the outer surface of the arm of said person so as to locate said second leg at a predetermined point on said shoulder.

6. In a tailor's rule the combination of a square having a leg arranged to extend across the back of a person to be measured, and a second leg fixed with the first, transversely thereof, and arranged to rest on a shoulder of said person, and leveling means for establishing a horizontal position of one of said legs, said means being arranged to indicate correctly in inverted position whereby said square may be used alternatively with said second leg resting upon either shoulder of said person.

7. In a tailor's rule the combination of a square having a leg arranged to extend across the back of a person to be measured, a second leg fixed with the first, transversely thereof, and arranged to rest on a shoulder of said person, a third leg fastened transversely of said second leg, and positioned to contact the outer surface of the arm of said person so as to locate said second leg at a predetermined point on said shoulder, and leveling means arranged for determining a true horizontal position of one of said legs.

8. In a tailor's rule the combination of a square having legs arranged to be fixed together transversely of each other, one of said legs being arranged to rest on a shoulder of a figure being measured, said legs being jointed to permit folding of said rule, and a pair of relatively inverted spirit levels on said rule, and arranged to indicate the true horizontal positioning of said rule when placed on one shoulder of said figure, and also when said rule is placed in inverted position on the other shoulder of said figure.

WM. M. MASI.